United States Patent [19]

Mikkonen et al.

[11] Patent Number: 5,058,523
[45] Date of Patent: * Oct. 22, 1991

[54] WARNING DEVICE

[76] Inventors: John W. Mikkonen, 5916 Sunset Blvd., Racine, Wis. 53406; Frederick C. Hansen, 19022 - 58th Rd., Union Grove, Wis. 53182

[*] Notice: The portion of the term of this patent subsequent to Jun. 26, 2007 has been disclaimed.

[21] Appl. No.: 504,632

[22] Filed: Apr. 4, 1990

Related U.S. Application Data

[63] Continuation-in-part of Ser. No. 374,764, Jul. 3, 1989, Pat. No. 4,936,244.

[51] Int. Cl.$^5$ .............. B60Q 11/00; G09B 11/10
[52] U.S. Cl. .................. 116/28 R; 116/306; 116/307; 116/309; 40/593
[58] Field of Search ............... 40/530, 593, 599, 611, 40/617, 643; 116/28 R, 215, 306, 307, 309, 311, 313, DIG. 1; 296/152

[56] References Cited

U.S. PATENT DOCUMENTS

| | | | |
|---|---|---|---|
| D. 244,105 | 4/1977 | Piekarski | D99/34 |
| 2,261,515 | 11/1941 | Emery | 116/309 |
| 2,447,226 | 8/1948 | Bennett | 40/599 |
| 3,237,330 | 3/1966 | Dinstbir | 40/593 |
| 3,250,241 | 5/1966 | Levy et al. | 116/210 |
| 3,310,023 | 3/1967 | Linsley | 116/28 R |
| 4,120,259 | 10/1978 | Wilson | 116/210 |
| 4,123,022 | 1/1979 | Wood, Jr. | 40/591 |
| 4,212,260 | 7/1980 | Splan | 116/28 R |
| 4,236,479 | 12/1980 | Walker et al. | 116/28 R |
| 4,653,422 | 3/1987 | Allen | 116/28 R |
| 4,936,244 | 6/1990 | Hansen et al. | 116/28 R |

FOREIGN PATENT DOCUMENTS 2187875A 3/1987 United Kingdom ............... 116/215

Primary Examiner—Willaim A. Cuchlinski, Jr.
Assistant Examiner—W. Morris Worth
Attorney, Agent, or Firm—Jansson & Shupe

[57] ABSTRACT

A device for preventing inadvertent headlight illumination includes a first panel for securing the device to an interior surface of a vehicle. A second panel is attached to the first panel and is movable with respect thereto for exposing a warning legend. The warning legend is disposed on one or both of the panels and is exposed to the view of the operator when the second panel is moved. The warning device also includes a motor vehicle door from within the vehicle. A cavity is formed in the door and a panel is received in the cavity. The panel is movable from a repose position to a warning position in which it also interferes with access to the interior door handle.

7 Claims, 4 Drawing Sheets

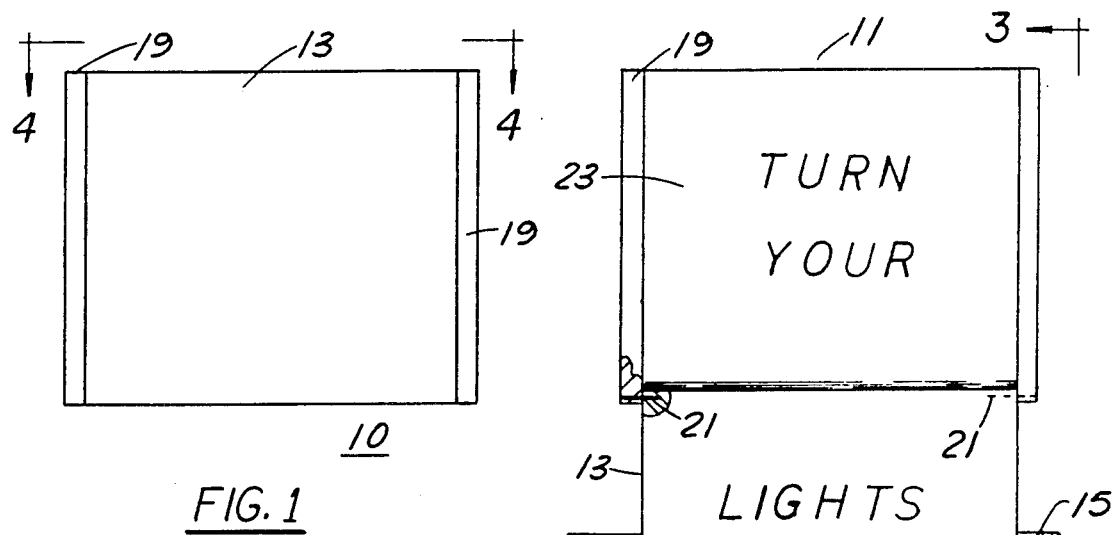
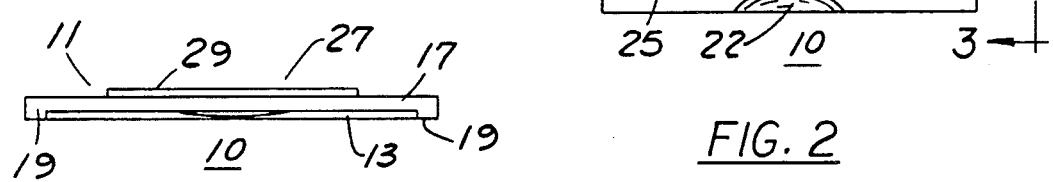
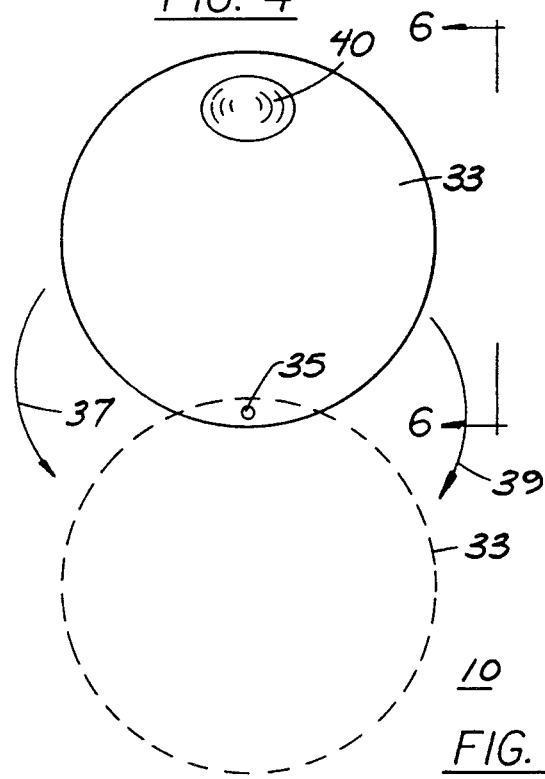
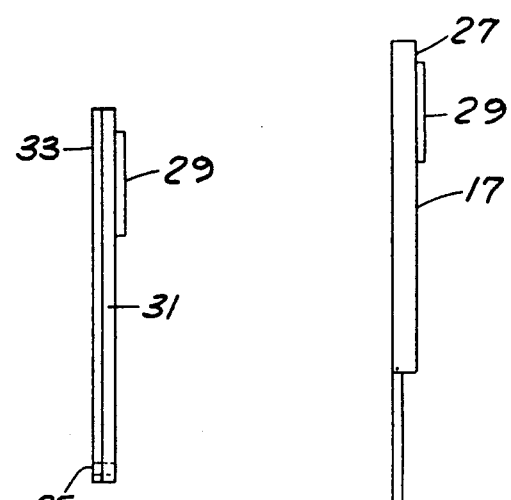
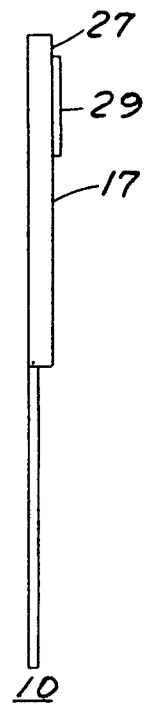

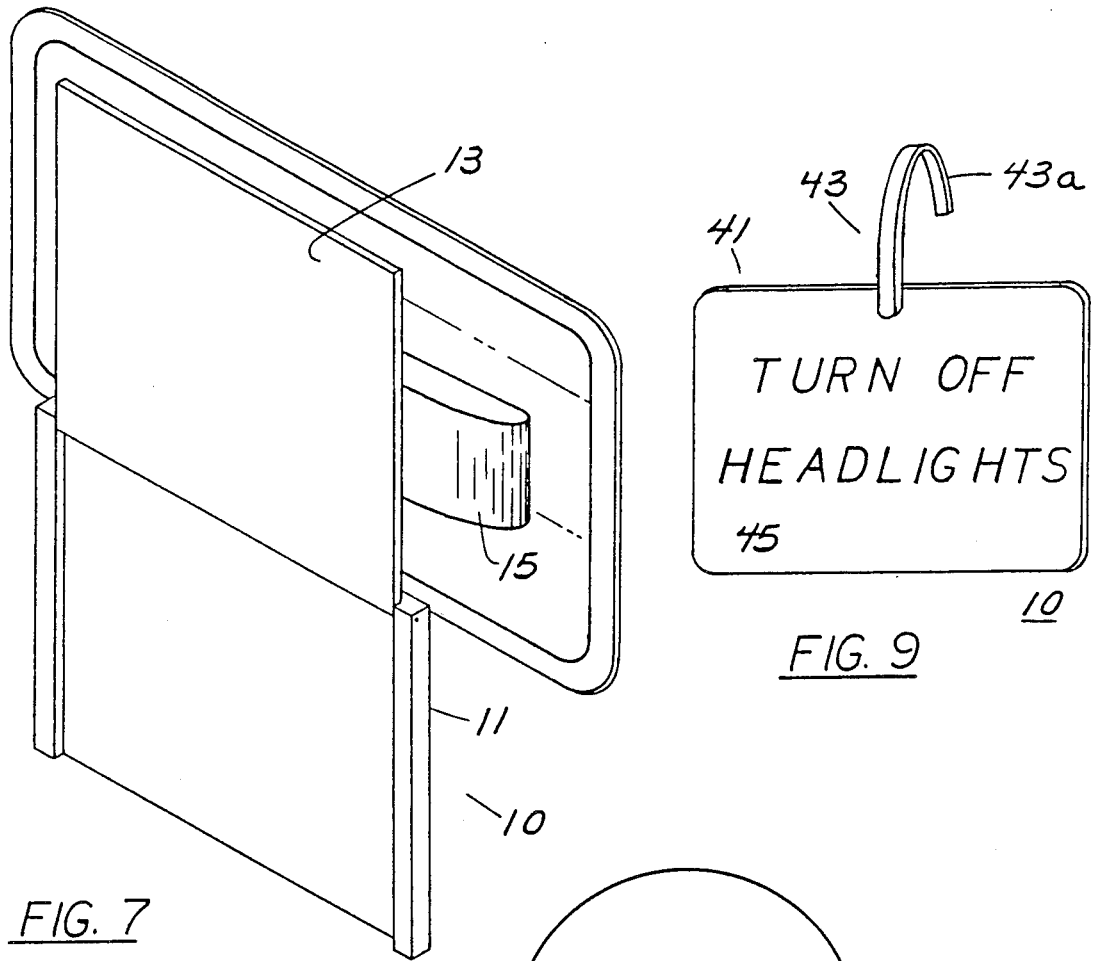
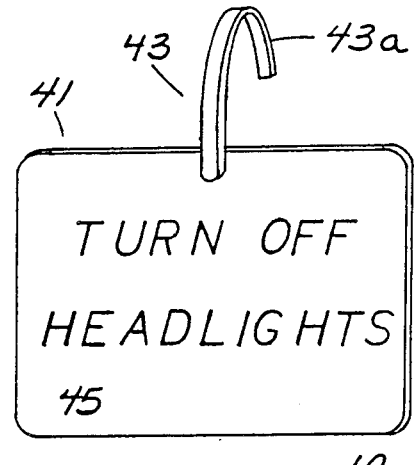
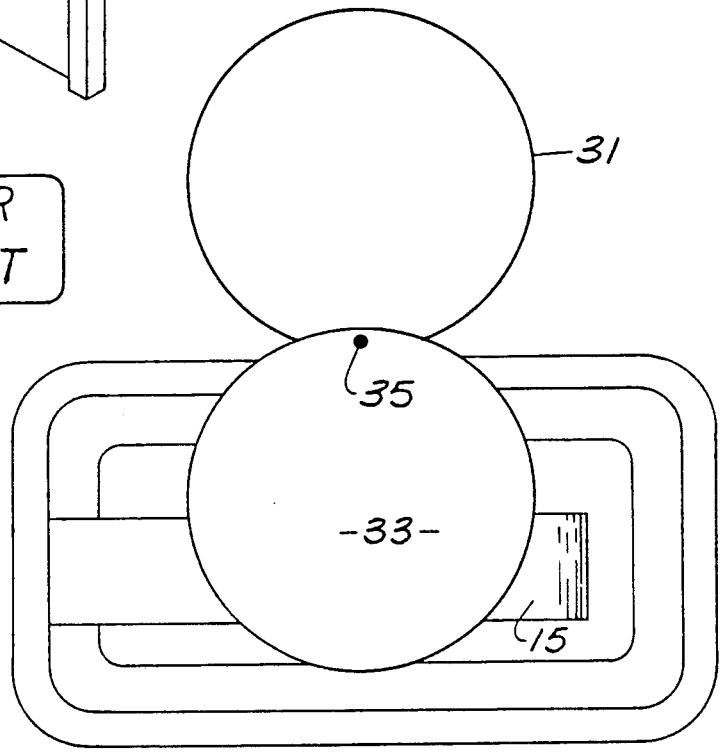
FIG. 7
FIG. 9
FIG. 10
FIG. 8

WARNING DEVICE

This application is a continuation-in-part of application Ser. No. 374,764 filed on July 3, 1989, now U.S. Pat. No. 4,936,244.

FIELD OF THE INVENTION

This invention is related generally to warning devices and, more particularly, to a passive device useful to the operator of a motor vehicle in preventing inadvertent headlight illumination.

BACKGROUND OF THE INVENTION

Drivers having even a minimum of experience in the operation of a motor vehicle have probably encountered situations where the use of headlights was required but where the condition requiring their use no longer existed by the time the vehicle was parked. Not infrequently, the driver fails to recall that the headlights are illuminated, the best result being an unnecessary return trip to the vehicle. More adverse results are notoriously common and involve a depleted auto battery with attendant frustration and delay. Such circumstances usually arise when an operator drives a vehicle from evening hours into daylight hours or during daylight foggy conditions. Both kinds of circumstances can at least, result in aggravation and at worst, significant cost if headlights are inadvertently left on.

One solution to this problem involves an automatic control which is usually supplied with the vehicle as original equipment. Such controls function to extinguish the headlights upon the simultaneous occurrence of two conditions, namely, de-energization of the ignition switch and the operator leaving the vehicle. Another approach to the problem involves the use of an audible signal actuated by the same co-existing conditions Both of these approaches involve an increment of added cost to the price of the vehicle and tend to be susceptible to break down and failure over the longer term. The latter approach also tends to be disruptive in quiet neighborhoods.

A warning device which may be readily adapted to any vehicle, which is low in cost and silent and effective in use would be an important development.

OBJECTS OF THE INVENTION

It is an object of this invention to overcome the shortcomings of the prior art, some of which are described above.

Another object of the invention is to provide a device which may be readily mounted to virtually any motor vehicle.

Still another object of the invention is to provide a warning device which is low in cost.

Yet another object of the invention is to provide a warning device which interdicts normal operation of the door opening handle when the device is in use.

How these and other important objects are achieved will be apparent from the description of the invention which follows.

SUMMARY OF THE INVENTION

A warning device for preventing inadvertent headlight illumination includes a first panel for securing the device to an interior surface of a vehicle. A second panel is attached to the first panel and is moveable with respect thereto for exposing a warning legend. The warning legend is disposed on one or both of the panels and is exposed to the view of the operator when the second panel is moved.

In one preferred embodiment of the invention, the warning device includes a first panel having a rear surface prepared to secure the device to the interior door surface of a vehicle. A second panel is attached to the first panel for hinged movement with respect thereto and is moveable between a first repose position and a second warning position. The panels may have generally the same shape, e.g., rectangular, circular, oval or otherwise and may be approximately or identically the same size. When the device is mounted on an interior surface of a vehicle, it is preferable that it be positioned in such a manner that the second panel selectively interferes with operator access to the interior door handle. A warning legend is disposed on one or both of the panels in a manner to be exposed to the view of the vehicle operator when the second panel is in the warning position For attachment to the interior surface of a vehicle door, the rear surface of the first panel may include an adhesive backing or a Velcro strip to attach to a similar strip adhering to the door surface.

In another preferred embodiment of the inventive device, the first panel and the second panel may be formed as circular, oval or other arcuate shapes which are devoid of corners. The panels may also be formed as rectangles (not shown) and in this configuration, the panels will nevertheless lend themselves to the construction described below. The second panel and the first panel are pivotably pinned to one another adjacent their respective edges so that the second panel may be swung out of juxtaposition to the first panel to expose the warning legend and to interfere with the operation of the door handle. It is to be appreciated that the embodiments described above may not only be constructed as an accessory to be purchased by the auto owner, they may also be incorporated into the door structure by the auto manufacturer.

A third embodiment of the invention includes a panel which is formed as a unitary structure that has means for attaching the panel to the door handle. The panel includes an exposed warning legend and may be attached to the door handle by a hook or other means. In all of the embodiments, it is preferred to include a separate legend tab which may be affixed to the interior of the vehicle, preferably adjacent the headlight switch for instructing the operator in the use of the device.

BRIEF DESCRIPTION OF THE DRAWINGS

FIG. 1 is a front elevation view of a first embodiment of the warning device with the second panel in the repose position;

FIG. 2 is a front elevation view of the device of FIG. 1 shown in one mounting position in conjunction with an interior door handle of a vehicle with the second panel shown in the warning position and with parts shown in dotted outline and others broken away;

FIG. 3 is a side elevation view of the device of FIG. 2 taken along the viewing plane 3—3 of FIG. 2;

FIG. 4 is a top plan view of the device of FIG. 1 taken along the viewing plane 4—4 of FIG. 1;

FIG. 5 is a front elevation view of another embodiment of the device with the second panel shown in repose position overlaying the first panel in solid outline and shown in the alternate warning position in dotted outline;

FIG. 6 is a side elevation view of the device of FIG. 5 taken along the viewing plane 6—6 of FIG. 5 with the second panel shown in the repose position and with part shown in dotted outline;

FIG. 7 is a front elevation perspective view of the first embodiment of the device shown in an alternate mounting position and in conjunction with the interior door handle of a vehicle;

FIG. 8 is a front elevation view of the embodiment of the device shown in FIG. 5 and shown in conjunction with the interior door handle of a vehicle with the second panel in the warning position;

FIG. 9 is a front elevation perspective view of yet another embodiment of the device;

FIG. 10 is a front elevation view of an exemplary legend tab useful with any embodiment of the warning device.

DETAILED DESCRIPTION OF PREFERRED EMBODIMENTS

Figure 11:
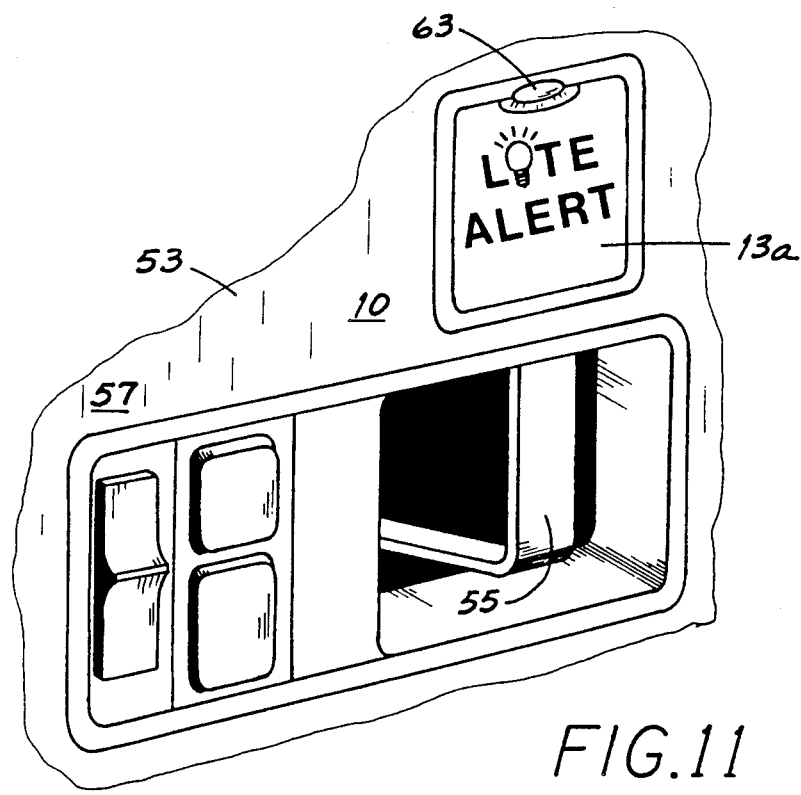
FIG. 11 is a perspective view of the device in the repose position and installed within a cavity in a vehicle door.

Referring first to FIGS. 1, 2, 3 and 4, a highly preferred embodiment of the warning device 10 is shown to include a first panel 11 for securing the device 10 to an interior door of a vehicle. A second panel 13 is attached to the first panel 11 for hinged movement and is moveable between a first, repose position as shown in FIG. 1 and a second, warning position as shown in FIG. 2. Referring particularly to FIGS. 2 and 7, it is preferred that the device 10 be located within the vehicle interior in a manner such that the second panel 13 is capable of interfering with operator access to the vehicle interior door handle 15 when the panel 13 is in the warning position. FIG. 2 illustrates how the device 10 may be mounted above the door handle 15 while FIG. 7 illustrates mounting below the door handle. A warning legend may be disposed on either or both panels and is exposed to the view of the vehicle operator when the second panel is in the warning position.

More particularly and referring additionally to FIG. 4, the first panel 11 includes a generally planar rear member 17 having side rails 19 extending therefrom to a length which is generally equal to the thickness of the second panel 13. In a variation, the side rails 19 could be omitted and/or the first panel 11 and the second panel 13 connected by a thin plastic, web-like membrane (not shown) for hinged movement. This would permit the first panel 11 and the second panel to be molded in a single operation. The second panel 13 is embodied as a generally planar member which is attached to the first panel 11 by small pins 21 for hinged movement with respect to the panel. The width of the second panel 11 and the dimension between the interior surfaces of the side rails 19 are cooperatively selected so that the second panel 13 is frictionally retained in the first repose position as shown in FIG. 1 when the device 10 is not in use. As shown in FIGS. 2 and 3, the second panel 13 may be moved to the warning position and a finger notch 22 may optionally be provided for the purpose. In place of the finger notch 22, the panel 13 may be extended upward slightly (not shown) to present an edge for finger engagement. Preferably, the device 10 will be located in the vehicle interior so that when the second panel 13 is in the warning position, it will cover and therefore interfere with operator access to the door handle 15.

Referring particularly to FIGS. 2 and 7, it is to be appreciated that the device 10 may be mounted below or beside as well as above the door handle 15 and that movement of the second panel 13 to the warning position will effect the warning condition. It is also to be appreciated that a warning legend such as "TURN OFF HEADLIGHTS" may be placed on the surface 23 of the first panel 11 or on the surface 25 of the second panel 13. Either surface 23, 25 will be exposed when the second panel 13 is in the position shown in FIGS. 2 and 3. Placement of the legend should be made in view of the mounting position of the device 10 so that the legend is upright to the view of the operator when the second panel 13 is in the warning position.

The rear surface 27 of the rear member 17 may be glued or otherwise affixed to the vehicle by the user. In the alternative, the rear surface 27 may be prepared for attachment to the vehicle by using an adhesive backing 29 or by using a pair of adhering strips commonly available under the trademark VELCRO.

Referring next to FIGS. 5, 6, and 8, a second embodiment of the device 10 is shown to include a first, generally planar panel 31 for securing the device 10 to an interior surface of a vehicle. A second, generally planar panel 33 is pivotably attached to the first panel 31, thereby permitting the second panel 33 to be placed in a repose position as shown in FIG. 6 and in solid outline in FIG. 5 or in a warning position, as shown in dotted outline in FIG. 5 and solid outline in FIG. 8. Placement of the second panel 33 to either position is by rotation of the panel 33 in either direction about the pin 35 as shown by the arrows 37, 39. Movement is in a plane parallel to the plane defined by the first panel 31 and a finger depression 40 may optionally be provided for ease of movement. In this embodiment, the first panel 31 and the second panel 33 are preferably of substantially identical size and have perimeter edges defining any convenient shape, e.g., circle, oval or otherwise being devoid of corners. While the appearance of the second embodiment of the device 10 will be enhanced by general equivalency of size and shape of the panels 31, 33, either panel 31, 33 may have a size or shape disparate from that of the other panel 31, 33. 10 A warning legend such as described above may be placed upon the first panel 31 or upon the second panel 33 If the latter is selected, placement should be in such a manner that the legend is upright to the view of the vehicle operator when the second panel 33 is in the dotted position shown in FIG. 5 and is inverted when it is in the position shown in FIG. 6. An attaching backing or adhesive 29 is disposed on the rear surface of the first panel 31 for mounting the device 10 to a vehicle.

Referring next to FIG. 9, a third embodiment of the warning device 10 includes a single panel 41 formed as a unitary structure and having means 43 for attaching the panel 41 to the door handle 15. The panel 41 includes a warning legend 45 for preventing inadvertent illumination of the vehicular headlights. Attachment to the door is preferably to the handle 15 thereof by a small hook 43a. In the alternative, the panel 41 may be stored near the headlight switch using adhering Velcro strips. When use of the panel 41 is desired, it may be moved to be mounted on another Velcro strip adjacent the door handle.

Referring next to FIG. 10, it is preferred that any of the embodiments of the device 10 be used in conjunction with a legend tab 47 which may be affixed to the interior of the vehicle for instructing the operator in the use of the device 10. A preferred place of attachment is adjacent the headlight switch and attachment may be by any of the means described above or by other means.

To use the device 10, the rear surface 27 of the first panel 11 of the first embodiment of FIGS. 1-4 or the second embodiment of FIGS. 5-6 is attached to the interior of the vehicle. Attachment is preferably in such a way that when the second panel 13 or 33 is in the warning position, it will interfere with the use of the handle 15. When encountering a situation in which vehicle headlights are apt to be left on inadvertently, the second panel 13 or 33 is moved to the second warning position. In the case of the embodiment of FIG. 9, the device 10 is merely removed from a place of storage and attached to the door handle 15. When operation of the vehicle is terminated, the operator will be reminded by the device 10 to turn off the headlights.

Figure 12:
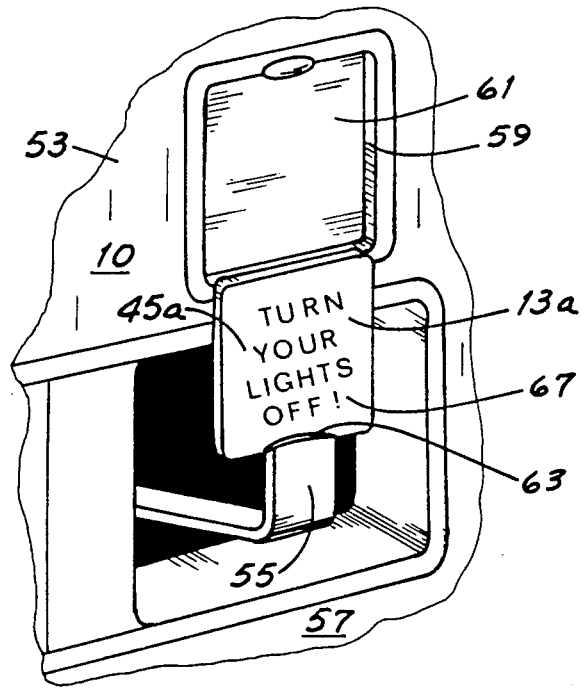
FIG. 12 is a perspective view of the device in the warning position

Referring next to FIGS. 11 and 12, the device 10 may also be advantageously installed in the interior of a motor vehicle as original equipment. A motor vehicle door 53 includes an interior door handle 55 for opening the door 53 from within the vehicle. Such handles are often inset so that no part of the handle projects beyond the finished interior surface 57 into the passenger compartment. The handle 55 is operated by grasping and drawing it outward toward the passenger compartment, i.e., to a position at which the handle 55 projects well beyond the interior surface 57.

A cavity 59 is formed in the interior surface 57 and is positioned generally adjacent the door handle 55. While such cavity 59 is located slightly above the handle 55 in FIGS. 11 and 12, it could also be positioned below the handle, just forward thereof or, depending upon the configuration of a particular vehicle door, just to the rear thereof. The cavity 59 also includes a generally planar rear wall and the depth of the cavity 59 is selected to conveniently accommodate the thickness of the panel 13A.

Figure 14:
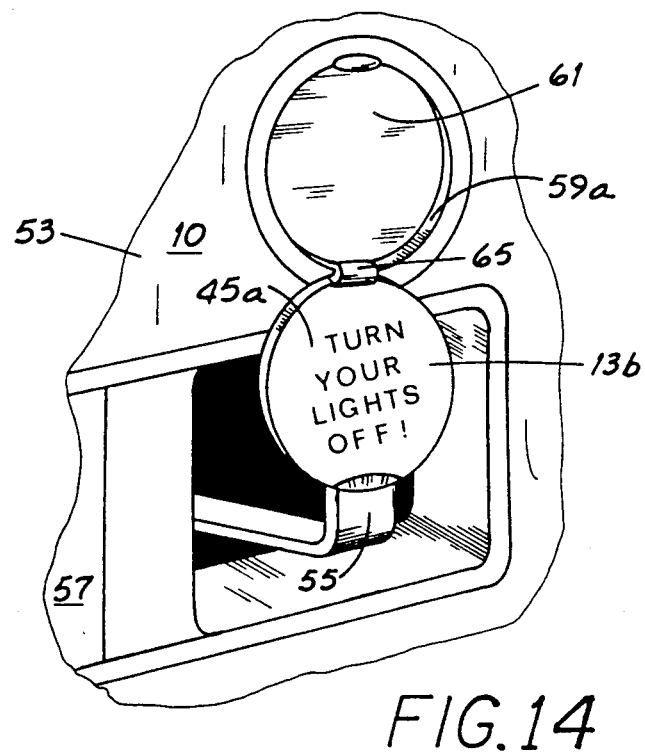
FIG. 14 is a perspective view of the embodiment of the device shown in FIG. 13 with the device in the warning position.

A panel 13a is received in the cavity 59 and is pivotably movable from a first repose position within the cavity 59 as shown in FIG. 11 Movement may be by engaging a small thumb notch 63 at the top of the panel 13a or the panel 13a may have a small handle (not shown) attached thereto. The size and shape of the panel perimeter is selected to fit within the cavity 59 with slight friction for retaining the panel in the repose position when not in use. The panel 13a is pivotably mounted by any one of several known means including by pivot pins 21 as shown in FIG. 2, by a single point hinge 65 adjacent the bottom of the panel 13a as shown in FIG. 14 or by a flexible web of a known type (not shown). The panel 13a includes a rear surface 67 which is visible from within the vehicle only when the panel 13a is placed in the second position. In one highly preferred embodiment, a warning legend 45a is disposed on the rear surface 67 and is exposed to the view of a vehicle operator only when the panel 13a is in the second position as shown in FIG. 12. In the alternative, the warning legend 45a may be placed upon the rear wall 61 of the cavity 59 and thereby become visible as the panel 13a is moved to the second position.

Coincident with the display of the warning legend 45a, the panel 13a also interferes with access to the door handle 55. Such interference need be only to the degree necessary to provide a tactile indication that the panel 13a is in the second position and that, in all likelihood, the headlights have inadvertently been left on.

In a highly preferred embodiment, the warning device 10 also includes a legend tab 47 which is affixed to the interior of the vehicle in close proximity to the headlight switch. Such tab 47 could bear a legend as shown in FIG. 10 or any other legend which appropriately reminds a vehicle operator of the utility of the device.

Figure 13:
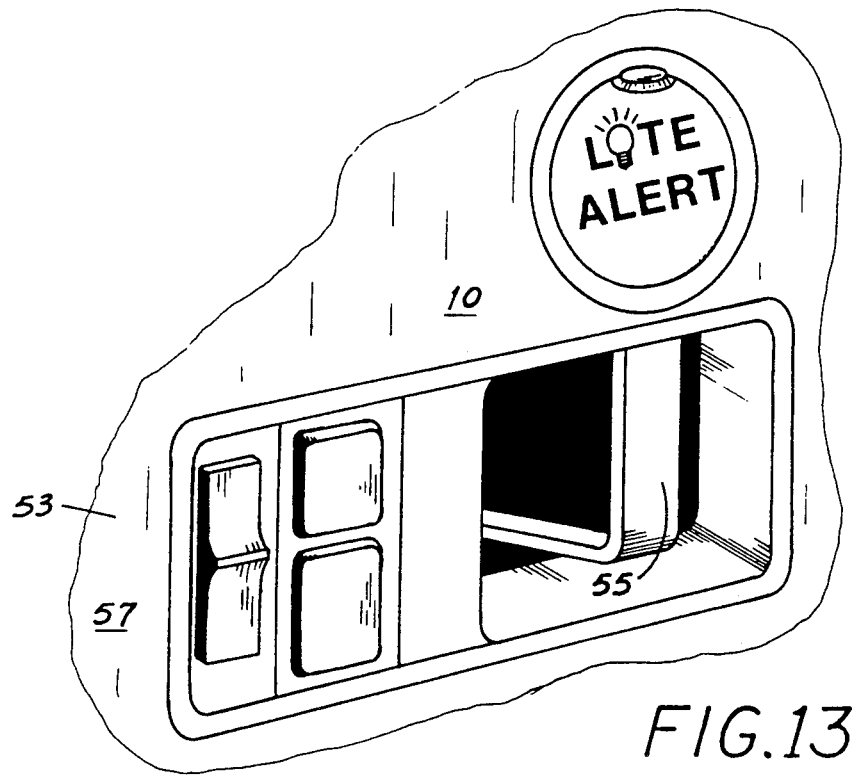
FIG. 13 is a perspective view of another embodiment of the device in the repose position and installed within a cavity in a vehicle door.

FIGS. 13 and 14 are presented to illustrate that the cavity 59a and the panel 13b received therein need not be square or rectangular in shape. Such cavity 59a and panel 13b may also be circular or, for that matter, may have some other geometric or irregular shape.

While several embodiments of the invention have been shown and described, these are by way of example and not by way of limitation.

We claim:

1. In a motor vehicle, a warning device for preventing inadvertent headlight illumination by selectively interfering with access to an interior door handle of the vehicle and comprising:
    a motor vehicle door including an interior door handle for opening the door from within the vehicle and further including an interior surface visible from within the vehicle;
    a cavity formed in the interior surface and positioned generally adjacent the door handle;
    a panel received in the cavity and pivotably movable from a first repose position within the cavity to a second position for exposing a warning legend, the legend being exposed to the view of an operator of the vehicle only when the panel is in the second position;
    the panel also interfering with access to the door handle when the panel is in the second position;
    the device thereby preventing inadvertent headlight illumination.

2. The invention of claim 1 wherein the cavity includes a rear wall and wherein the warning legend is disposed on the rear wall.

3. The invention of claim 1 wherein the panel includes a rear surface visible from within the vehicle when the panel is in the second position and wherein the warning legend is disposed on the rear surface.

4. The invention of claim 1 wherein the cavity is positioned above the door handle.

5. The invention of claim 1 wherein the cavity is positioned below the door handle.

6. The invention of claim 1 wherein the vehicle further includes a switch for operating the vehicle headlights and wherein a legend tab is affixed to the interior of the vehicle in close proximity to such switch.

7. In a motor vehicle having a switch for operating the headlights thereof, a warning device for preventing inadvertent headlight illumination by selectively interfering with access to an interior door handle of the vehicle and comprising:
    a motor vehicle door including an interior door handle for opening the door from within the vehicle and further including an interior surface visible from within the vehicle;

a cavity formed in the interior surface and positioned generally adjacent the door handle;

a panel received in the cavity and pivotably movable from a first repose position within the cavity to a second position for exposing a warning legend;

the panel including a rear surface having a warning legend disposed thereon which is exposed to the view of an operator of the vehicle only when the panel is in the second position;

the panel also interfering with access to the door handle when the panel is in the second position;

a tab affixed to the interior of the vehicle generally adjacent the headlight switch, such tab including a reminder legend regarding use of the warning device;

the device thereby preventing inadvertent headlight illumination by continually presenting a reminder legend and by selectively interfering with access to the door handle.

* * * * *

UNITED STATES PATENT AND TRADEMARK OFFICE
CERTIFICATE OF CORRECTION

PATENT NO. : 5,058,523

DATED      : October 22, 1991

INVENTOR(S): John W. Mikkonen and Frederick C. Hansen

It is certified that error appears in the above-identified patent and that said Letters Patent is hereby corrected as shown below:

In column 2, line 20, after "tion" insert a --.--.

In column 4, line 51 delete "10".

In column 4, line 51, a new paragraph should start with the sentence "A warning legend".

In column 4, line 53, after "panel 33", insert a --.--.

In column 5, line 14, the line starting with "first panel" should be flush with the left margin.

In column 5, line 50, after "FIG. 11" insert a --.--.

Signed and Sealed this

Twenty-third Day of February, 1993

*Attest:*

STEPHEN G. KUNIN

*Attesting Officer*     *Acting Commissioner of Patents and Trademarks*